(12) United States Patent
Yang et al.

(10) Patent No.: US 10,953,366 B2
(45) Date of Patent: Mar. 23, 2021

(54) NITROGEN OXIDES AND HYDROCARBON STORAGE CATALYST AND METHODS OF USING THE SAME

(71) Applicant: GM GLOBAL TECHNOLOGY OPERATIONS LLC, Detroit, MI (US)

(72) Inventors: Ming Yang, Novi, MI (US); Lei Wang, Rochester Hills, MI (US); Shouxian Ren, Rochester Hills, MI (US); Wei Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 128 days.

(21) Appl. No.: 15/958,020

(22) Filed: Apr. 20, 2018

(65) Prior Publication Data

US 2019/0321783 A1 Oct. 24, 2019

(51) Int. Cl.
  *B01J 23/02* (2006.01)
  *B01J 29/068* (2006.01)
  (Continued)

(52) U.S. Cl.
  CPC ..... *B01D 53/9422* (2013.01); *B01D 53/9486* (2013.01); *B01J 23/02* (2013.01);
  (Continued)

(58) Field of Classification Search
  CPC .... F01N 3/0814; F01N 3/0835; F01N 3/0842; B01D 53/9422; B01D 53/9486;
  (Continued)

(56) References Cited

U.S. PATENT DOCUMENTS 7,930,881 B2  4/2011  Goersmann et al.
8,752,367 B2  6/2014  Goersmann et al.
(Continued)

FOREIGN PATENT DOCUMENTS

AU  2003293327 A1  4/2005
CN  110385140 A  10/2019
(Continued)

OTHER PUBLICATIONS

Shouxian Ren et al.; U.S. Appl. No. 15/427,413, filed Feb. 8, 2017 entitled "Vehicle Having a Nitrogen Oxides Storage Converter and On-Board Method for Monitoring and Diagnosing the Nitrogen Oxides Storage Converter"; 23 pages.
(Continued)

*Primary Examiner* — Cam N. Nguyen
(74) *Attorney, Agent, or Firm* — Harness, Dickey & Pierce, P.L.C.

(57) ABSTRACT

A nitrogen oxides ($NO_x$) and hydrocarbon (HC) storage catalyst for treating an exhaust gas flow is provided. The $NO_x$ and HC storage catalyst includes (a) a zeolite, (b) noble metal atoms, and (c) a metal oxide, a non-metal oxide, or a combination thereof. One or more of the noble metal atoms is present in a complex with the metal oxide, the non-metal oxide or a combination thereof. The complex is dispersed within a cage of the zeolite. Methods of preparing the $NO_x$ and HC storage catalyst and methods of using the $NO_x$ and HC storage catalyst for treating an exhaust gas stream flowing from a vehicle internal combustion engine during a period following a cold-start of the engine are also provided.

20 Claims, 6 Drawing Sheets

(51) Int. Cl.
    *B01J 37/00*    (2006.01)
    *B01J 37/02*    (2006.01)
    *B01J 37/08*    (2006.01)
    *B01J 37/30*    (2006.01)
    *F01N 3/08*     (2006.01)
    *B01D 53/94*    (2006.01)

(52) U.S. Cl.
    CPC ......... *B01J 29/068* (2013.01); *B01J 37/0009* (2013.01); *B01J 37/0201* (2013.01); *B01J 37/08* (2013.01); *B01J 37/30* (2013.01); *F01N 3/0814* (2013.01); *F01N 3/0835* (2013.01); *F01N 3/0842* (2013.01); *B01D 2255/1023* (2013.01); *B01D 2255/2042* (2013.01); *B01D 2255/50* (2013.01); *B01D 2255/91* (2013.01); *B01D 2255/912* (2013.01); *F01N 2570/12* (2013.01); *F01N 2570/14* (2013.01)

(58) Field of Classification Search
    CPC ...... B01J 23/02; B01J 29/068; B01J 37/0009; B01J 37/0201; B01J 37/08; B01J 37/30
    See application file for complete search history.

(56) References Cited

U.S. PATENT DOCUMENTS

| | | | |
|---|---|---|---|
| 8,906,331 B2 | 12/2014 | Koch et al. | |
| 8,920,756 B2 | 12/2014 | Koch et al. | |
| 8,987,162 B2* | 3/2015 | Narula | C01B 39/46 502/74 |
| 9,114,376 B2* | 8/2015 | Fedeyko | B01J 29/74 |
| 9,404,045 B2* | 8/2016 | Gaffney | B01J 29/064 |
| 9,498,775 B2 | 11/2016 | Zheng et al. | |
| 9,597,635 B2 | 3/2017 | Qi et al. | |
| 9,656,254 B2* | 5/2017 | Bull | B01D 53/9418 |
| 9,669,397 B2* | 6/2017 | Althoff | B01J 29/44 |
| 9,751,080 B2* | 9/2017 | Fedeyko | B01J 29/74 |
| 9,828,896 B2* | 11/2017 | Swallow | B01D 53/9477 |
| 9,889,437 B2* | 2/2018 | Yang | B01J 29/763 |
| 9,908,783 B2* | 3/2018 | Schmidt | B01J 29/064 |
| 10,105,691 B2* | 10/2018 | Lupescu | B01D 53/945 |
| 10,265,689 B2* | 4/2019 | Manoylova | B01D 53/944 |
| 10,322,372 B2* | 6/2019 | Chen | B01J 29/072 |
| 10,399,037 B1 | 9/2019 | Wang et al. | |
| 2004/0042939 A1 | 3/2004 | Rajaram et al. | |
| 2006/0105902 A1* | 5/2006 | Pieterse | B01D 53/8628 502/60 |
| 2010/0111791 A1* | 5/2010 | Caudle | B01D 53/9436 423/213.5 |
| 2010/0172828 A1* | 7/2010 | Althoff | B01J 29/68 423/713 |
| 2011/0126527 A1 | 6/2011 | Hilgendorff | |
| 2011/0182790 A1* | 7/2011 | Chandler | B01D 53/9418 423/213.5 |
| 2014/0322127 A1* | 10/2014 | Althoff | B01J 29/7615 423/714 |
| 2015/0139874 A1 | 5/2015 | Zheng et al. | |
| 2015/0190793 A1 | 7/2015 | Swallow et al. | |
| 2015/0217282 A1* | 8/2015 | Fedeyko | B01J 29/74 423/213.5 |
| 2016/0222852 A1 | 8/2016 | Ren et al. | |
| 2017/0157564 A1 | 6/2017 | Ren et al. | |
| 2018/0058286 A1 | 3/2018 | Qi et al. | |
| 2018/0169624 A1 | 6/2018 | Chandler et al. | |
| 2018/0223712 A1 | 8/2018 | Ren et al. | |
| 2019/0093539 A1 | 3/2019 | Jung et al. | |

FOREIGN PATENT DOCUMENTS

| | | |
|---|---|---|
| DE | 102019109652 A1 | 10/2019 |
| GB | 2476573 A | 6/2011 |
| GB | 2561718 A | 10/2018 |
| JP | 4503593 B2 | 7/2010 |
| WO | 2005026046 A1 | 3/2005 |

OTHER PUBLICATIONS

Lei Wang et al.; U.S. Appl. No. 15/958,058, filed Apr. 20, 2018 entitled "Nitrogen Oxides Storage Catalyst and Methods of Using the Same"; 54 pages.

Hai-Ying Chen et al.; "Low Temperature no. Storage of Zeolite Supported Pd for Low Temperature Diesel Engine Emission Control," *Catal. Lett.* (2016) p. 146. https://doi.org/10.1007/s10562-016-1794-6. pp. 1706-1711.

\* cited by examiner

NITROGEN OXIDES AND HYDROCARBON STORAGE CATALYST AND METHODS OF USING THE SAME

INTRODUCTION

The present disclosure relates generally to exhaust gas treatment systems, and more specifically, to a nitrogen oxides ($NO_x$) and hydrocarbons (HC) storage catalyst and methods of using the same, particularly following cold-start of an engine.

Emissions control is one factor in engine design and engine control. One particular emission, $NO_x$, is a known by-product of combustion. $NO_x$ can comprise a mixture of one or more of nitric oxide (NO), nitrogen dioxide ($NO_2$) and, generally, smaller amounts of other nitrogen oxides. $NO_x$ is created by nitrogen and oxygen molecules present in engine intake air disassociating in the high temperatures of combustion, and rates of $NO_x$ creation include known relationships to the combustion process, for example, with higher rates of $NO_x$ creation being associated with higher combustion temperatures and longer exposure of air molecules to the higher temperatures.

$NO_x$ molecules, once created in a combustion chamber, can be converted back into nitrogen and water molecules in exemplary devices known in the art within the broader category of exhaust gas treatment or aftertreatment devices. Exhaust gas treatment or aftertreatment devices are known, for instance, utilizing chemical reactions to treat an exhaust gas flow. One exemplary device includes a selective catalytic reduction (SCR) device. An SCR device utilizes a reductant capable of reacting with $NO_x$ to reduce it to harmless nitrogen and water in the presence of an SCR catalyst. One exemplary reductant is ammonia, which may be derived from a urea injection. A number of alternative reductants are known in the art as well. It is also known to operate a diesel oxidation catalyst (DOC), for example, containing Platinum Group Metals (PGM, typically Pt and Pd), upstream of the SCR device in diesel applications to convert or oxidize a fraction of NO into $NO_2$ preferable for treatment in the SCR and additionally oxidize HC and carbon monoxide (CO) to carbon dioxide ($CO_2$) and water ($H_2O$). The DOC may also behave like a "diesel burner" to oxidize the injected diesel fuel to generate exotherm for supporting periodic soot oxidations or diesel particulate filter (DPF) regenerations. A diesel particulate filter (DPF) device can additionally be used to trap and/or remove particulate matter from the exhaust gas flow.

$NO_x$ reduction efficiency in an aftertreatment system is typically temperature dependent. Present exhaust treatment systems are quite effective in treating the exhaust from a warmed-up engine because the catalyst materials have been heated to temperatures (e.g., 250° C. and above) at which they serve to effectively oxidize carbon monoxide and incompletely burned fuel constituents, and to reduce $NO_X$. These treatment systems have been quite effective for both gasoline-fueled engines operating at a stoichiometric air to fuel ratio and diesel engines (and other lean-burn engines) which operate with considerable excess air (sometimes called "lean burn"). It has been difficult to treat exhaust emissions immediately following a cold engine start or cold-start, before the exhaust gas has heated a downstream catalytic reactor, such as an SCR, or other processing containers to the effective temperatures of the catalyst or other functioning materials. It is realized that such untreated emissions will make-up a significant portion of the total emissions in the mandated testing of engine exhaust systems. The problem is particularly difficult with the treatment of $NO_X$ in the exhaust of diesel engines. Therefore, there is a need for better systems for treating the exhaust gas from an engine following a cold-start. The need is particularly acute in lean-burn engines, such as diesel engines, which tend to produce cooler exhaust streams because of the excess air used in the combustion mixtures charged to their cylinders.

SUMMARY

This section provides a general summary of the disclosure, and is not a comprehensive disclosure of its full scope or all of its features.

In certain aspects, the present disclosure provides a nitrogen oxides ($NO_x$) and hydrocarbon (HC) storage catalyst for treating an exhaust gas flow. The $NO_x$ and HC storage catalyst may include (a) a zeolite, (b) noble metal atoms, (c) a metal oxide, a non-metal oxide, or a combination thereof. The zeolite may include a cage and have a framework structure selected from the group consisting of BEA, MFI, CHA, AEI, EMT, ERI, MOR, MER, FER, FAU, LEV, MWW, CON, EUO, and combinations thereof. The noble metal atoms may be selected from the group consisting of Pd atoms, Pt atoms, Rh atoms, Ag atoms, Ru atoms, Au atoms, Ir atoms and combinations thereof. The metal of the metal oxide may be selected from the group consisting of alkali metals, alkaline earth metals, transitions metals, lanthanides, and combinations thereof, and the non-metal of the non-metal oxide may be phosphorus. One or more of the noble metal atoms may be present in a complex with: (i) the metal oxide; (ii) the non-metal oxide; or (iii) the metal oxide and the non-metal oxide. The complex may be dispersed within the cage of the zeolite.

The noble metal atoms may be present in an amount of about 0.1 wt. % to about 10 wt. % based on total weight of the $NO_x$ and HC storage catalyst.

The metal oxide, the non-metal oxide, or a combination thereof is present in an amount of about 1 mol % to about 8 mol %.

The zeolite may be selected from the group consisting of chabazite, SSZ-13, DAF-5, LZ-218, UiO-21, ZK-14, and ZYT-6.

The noble metal atoms may be Pd atoms, Pt atoms, or a combination thereof.

The metal of the metal oxide may be selected from the group consisting of Na, K, Mg, Ca, Ba, Ti, Ce, and combinations thereof.

In other aspects, the present disclosure provides a method of preparing a $NO_x$ and HC storage catalyst. The method may include incorporating noble metal atoms into a zeolite to form a noble metal-substituted zeolite. The noble metal atoms may be selected from the group consisting of Pd atoms, Pt atoms, Rh atoms, Ag atoms, Ru atoms, Au atoms, Ir atoms and combinations thereof. The zeolite may include cages and have a framework structure selected from the group consisting of BEA, MFI, CHA, AEI, EMT, ERI, MOR, MER, FER, FAU, LEV, MWW, CON, EUO, and combinations thereof. The method may further include adding a metal oxide precursor, a non-metal oxide precursor, or a combination thereof in an amount less than about 8 mol. % to the noble metal-substituted zeolite to form an intermediate catalyst. The metal of the metal oxide precursor may be selected from the group consisting of alkali metals, alkaline earth metals, transitions metals, lanthanides, and combinations thereof, and the non-metal may be phosphorus. The method may further include calcining the intermediate catalyst at a ramp rate of less than about 5° C./minute to a temperature up to about 800° C. to form a complex dispersed within the cage of the zeolite. The complex may include one or more of the noble metal atoms with: (i) a metal oxide; (ii) a non-metal oxide; or (iii) the metal oxide and the non-metal oxide.

The noble metal atoms may be incorporated into the zeolite via ion-exchange, incipient wetness impregnation, or grinding.

The noble metal atoms may be present in an amount of about 0.1 wt. % to about 10 wt. % based on total weight of the $NO_x$ and HC storage catalyst.

The zeolite may be selected from the group consisting of chabazite, SSZ-13, DAF-5, LZ-218, UiO-21, ZK-14, and ZYT-6.

The noble metal atoms may be Pd atoms, Pt atoms, or a combination thereof.

The metal of the metal oxide may be selected from the group consisting of Na, K, Mg, Ca, Ba, Ti, Ce, and combinations thereof.

In other aspects, the present disclosure provides a method of treating an exhaust gas stream flowing from a vehicle internal combustion engine during a period following a cold-start of the engine. The method may include contacting the exhaust gas stream including one or more of $NO_x$, HCs, carbon monoxide (CO), hydrogen ($H_2$), water ($H_2O$), carbon dioxide ($CO_2$), oxygen ($O_2$), and nitrogen ($N_2$) with a $NO_x$ and HC storage device under adsorption conditions and storing at least a portion of the $NO_x$, HC, or a combination thereof from the exhaust gas stream in the $NO_x$ and HC storage device. The $NO_x$ and HC storage device can include a $NO_x$ and HC storage catalyst disposed on a substrate. The $NO_x$ and HC storage catalyst may include (a) a zeolite, (b) noble metal atoms, (c) a metal oxide, a non-metal oxide, or a combination thereof. The zeolite may include a cage and have a framework structure selected from the group consisting of BEA, MFI, CHA, AEI, EMT, ERI, MOR, MER, FER, FAU, LEV, MWW, CON, EUO, and combinations thereof. The noble metal atoms may be selected from the group consisting of Pd atoms, Pt atoms, Rh atoms, Ag atoms, Ru atoms, Au atoms, Ir atoms and combinations thereof. The metal of the metal oxide may be selected from the group consisting of alkali metals, alkaline earth metals, transitions metals, lanthanides, and combinations thereof, and the non-metal of the non-metal oxide may be phosphorus. One or more of the noble metal atoms may be present in a complex with: (i) the metal oxide; (ii) the non-metal oxide; or (iii) the metal oxide and the non-metal oxide. The complex may be dispersed within the cage of the zeolite. The method may further include releasing at least a portion of the stored $NO_x$, HC, or a combination thereof from the $NO_x$ and HC storage device to the exhaust stream under desorption conditions.

In the method, the adsorption conditions may include the exhaust gas stream at a temperature less than or equal to about 200° C., the desorption conditions may include the exhaust gas stream at a temperature greater than 200° C., or a combination thereof.

The method may further include passing the exhaust gas stream through a downstream oxidation reactor, a downstream reduction reactor, or a combination thereof for further oxidation or reduction of constituents of the exhaust gas stream as the exhaust gas stream increases in temperature and heats the downstream oxidation reactor to an oxidation operating temperature, the downstream reduction reactor to a reduction operating temperature, or combinations thereof.

The exhaust gas stream contacting the $NO_x$ and HC storage catalyst may include one or more of: (i) an $H_2$ content of about 50 ppm to about 5000 ppm; (ii) a CO content of about 50 ppm to about 16000 ppm; and (iii) an HC content of about 50 ppm to about 8000 ppm.

The noble metal atoms may be present in an amount of about 0.1 wt. % to about 10 wt. % based on total weight of the $NO_x$ and HC storage catalyst.

The zeolite may be selected from the group consisting of chabazite, SSZ-13, DAF-5, LZ-218, UiO-21, ZK-14, and ZYT-6.

The noble metal atoms may be Pd atoms, Pt atoms, or a combination thereof.

The metal of the metal oxide may be selected from the group consisting of Na, K, Mg, Ca, Ba, Ti, Ce, and combinations thereof.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1A:
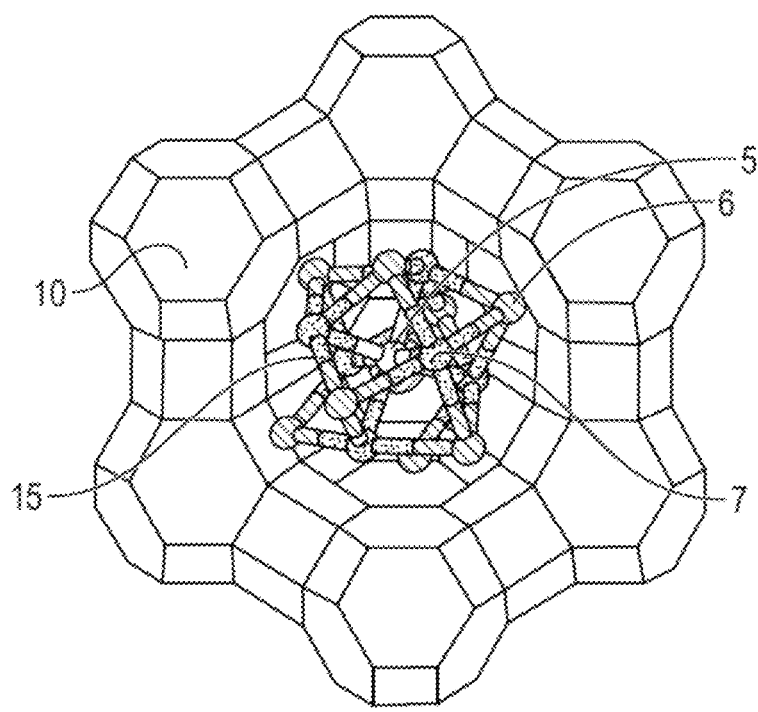
FIG. 1A illustrates a storage catalyst structure including a complex and zeolite structure according to one aspect of the disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," "attached to," or "coupled to" another element or layer, it may be directly on, engaged, connected, attached or coupled to the other component, element, or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

I. Nitrogen Oxides ($NO_x$) and Hydrocarbons (HC) Storage Catalyst and Methods of Making the Same Depending upon a number of variables, exhaust gas treatment systems can include a number of different components or modules, including diesel oxidation catalysts (DOC), selective catalytic reduction (SCR) devices, and diesel particulate filters (DPF). These various modules can be arranged in various ways depending on system requirements. During engine cold-start, these oxidation and reduction catalyst materials (e.g., DOC and SCR catalyst materials) must often be heated from ambient temperature to their respective operating temperatures by the exhaust gas stream. For example, for diesel engines, the temperature of the exhaust gas can be about −30° C. to about 50° C. from a cold engine and about 200° C. to about 400° C. from a warmed-up engine depending, for example, on engine load. Thus, $NO_x$ and HC emissions can occur from a tailpipe during engine cold-start before downstream DOC and SCR catalysts are sufficiently warm enough and active to sufficiently reduce and/or oxidize such exhaust gas stream components. However, it is necessary to convert most of the carbon monoxide (CO) and HC in the exhaust gas to carbon dioxide ($CO_2$) and water and to convert most of the $NO_x$ to nitrogen and water during all stages of engine operation, including the period when the exhaust gas stream is being heated.

$NO_x$ and HC storage catalysts (also referred to herein as "the storage catalyst") for treating an exhaust gas flow are provided herein to store $NO_x$, HC, or a combination thereof. The storage catalyst may store $NO_x$ and/or HC temporarily, for example, during engine cold-start, until conditions, such as temperature, for $NO_x$ reduction and/or oxidation of HC exist or a purge cycle can be operated to clean up adsorbed $NO_x$ and/or HC on the storage catalyst. As used herein, "engine cold-start" refers to starting an engine under cold conditions, for example, at an environmental temperature less than or equal to about 50° C. In any embodiment, a $NO_x$ and HC storage catalyst can comprise a zeolite, noble metal atoms and one or more of: (i) a metal oxide; and (ii) a non-metal oxide.

As used herein, "zeolite" is defined to refer to a synthetic or natural crystalline material having a porous framework structure built from tetrahedra atoms (e.g., silicon, aluminum, phosphorus) connected by bridging oxygen atoms. The zeolite framework has voids or pores in the form of cages or channels between the tetrahedra, which are defined by rings of interconnected oxygen (O), silicon (Si), phosphorus (P) and/or aluminum (Al) atoms. Zeolite particles may have an average pore size diameter of less than or equal to about 1.5 nm, less than or equal to about 1 nm, less than or equal to about 0.75 nm, less than or equal to about 0.5 nm, less than or equal to about 0.25 nm, less than or equal to about 0.1 nm, or about 0.01 nm. Additionally or alternatively, the zeolite particles may have an average pore size diameter of greater than or equal to about 0.1 nm to less than or equal to about 1.5 nm, greater than or equal to about 0.1 nm to less than or equal to about 1 nm, or greater than or equal to about 0.35 nm to less than or equal to about 0.7 nm. Zeolite materials having pore openings with widths or diameters as described above may include zeolite materials having pore openings defined by 8-membered, 9-membered, 10-membered, and/or 12-membered rings.

Examples of known zeolite frameworks are given in the "Atlas of Zeolite Frameworks" published on behalf of the Structure Commission of the International Zeolite Association", 6$^{th}$ revised edition, Ch. Baerlocher, L. B. McCusker, D. H. Olson, eds., Elsevier, New York (2007) and the corresponding web site, http://www.iza-structure.org/databases/. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, antimony, tin, and/or other transition metals that can substitute for silicon and/or aluminum in a zeolitic framework.

In any embodiment, the zeolite may have a framework type selected from the group consisting of BEA, MFI, CHA, AEI, EMT, ERI, MOR, MER, FER, FAU, LEV, MWW, CON EUO, and combinations thereof. In any embodiment, the zeolite may have CHA framework type. Examples of suitable CHA zeolites include, but are not limited to, chabazite, SSZ-13, DAF-5, LZ-218, UiO-21, ZK-14, ZYT-6, and combinations thereof.

In some embodiments, the zeolite particles may have a $SiO_2:Al_2O_3$ ratio of less than or equal to about 300, less than or equal to about 200, less than or equal to about 100, less than or equal to about 50, less than or equal to about 40, less than or equal to about 30, less than or equal to about 20, or about 10. Additionally or alternatively, the zeolite particles may have a $SiO_2:Al_2O_3$ ratio in the range of greater than or equal to about 10 to less than or equal to about 300, greater than or equal to about 10 to less than or equal to about 200, greater than or equal to about 10 to less than or equal to about 100, greater than or equal to about 10 to less than or equal to about 50, greater than or equal to about 10 to less than or equal to about 40, greater than or equal to about 10 to less than or equal to about 20, greater than or equal to about 20 to less than or equal to about 50. In some embodiments, zeolite particles with more $SiO_2$ compared to $Al_2O_3$ are preferred. In other embodiments, zeolite particles with more $Al_2O_3$ compared to $SiO_2$ are preferred.

Figure 1B:
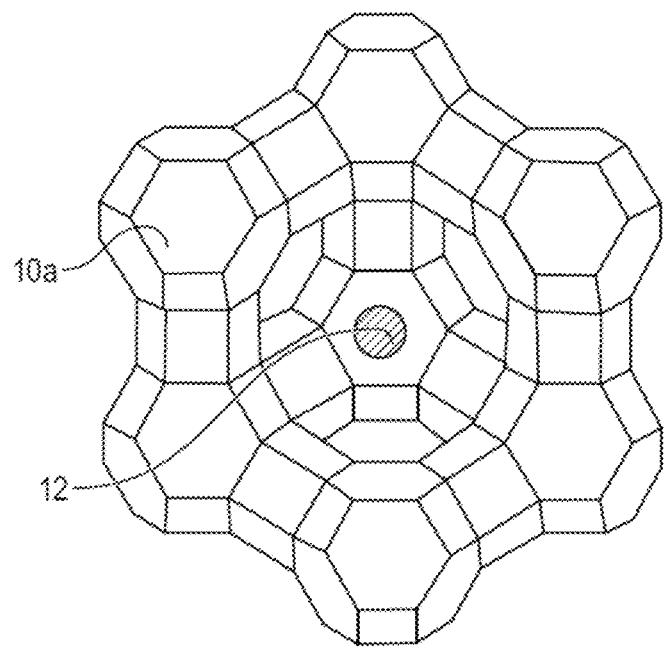
FIG. 1B illustrates a known storage catalyst structure including a noble metal and zeolite structure.
Figure 2:
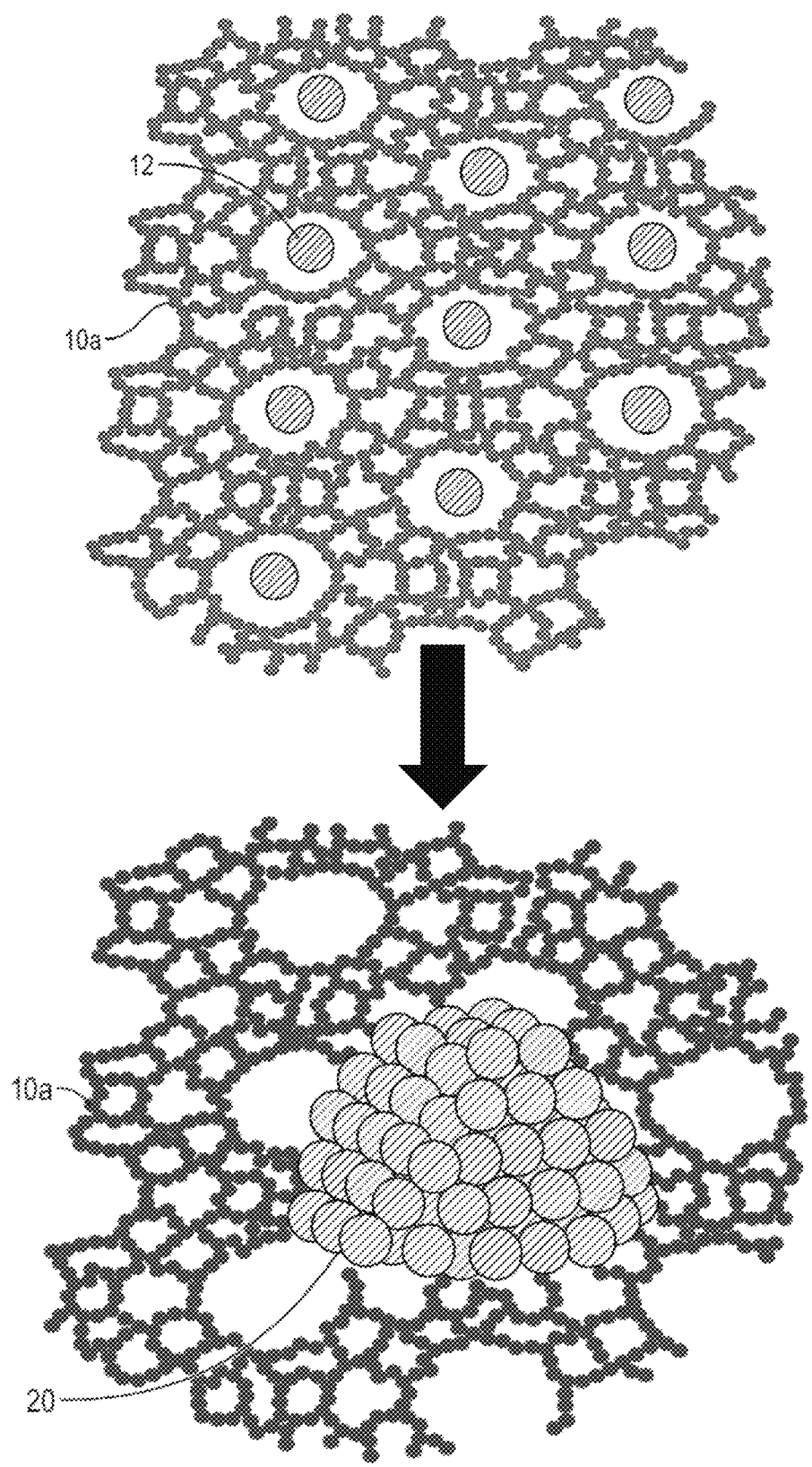
FIG. 2 illustrates a scheme showing migration of noble metals atoms from zeolite cages during use of a known storage catalyst structure.
Figure 3:
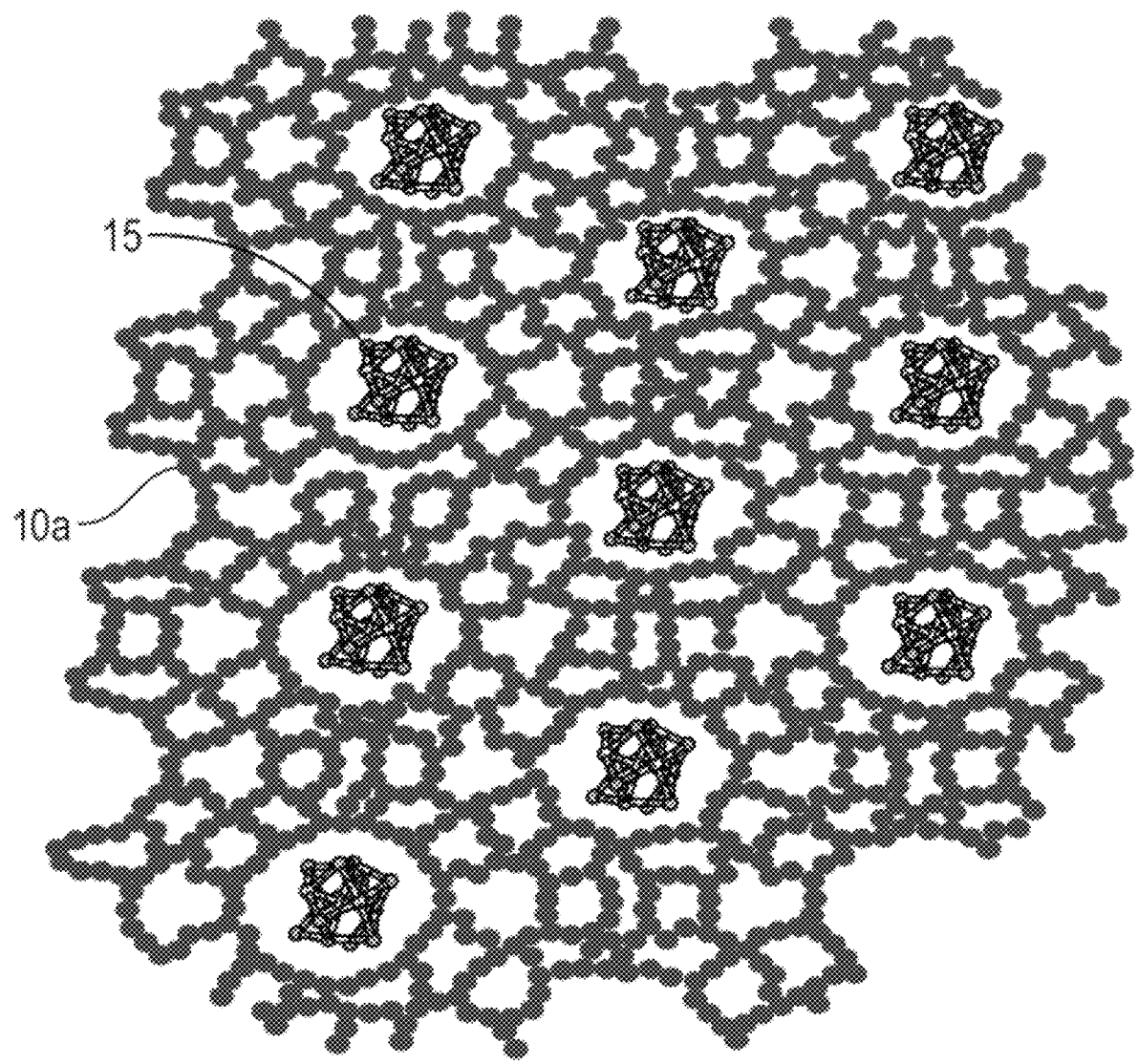
FIG. 3 illustrates a storage catalyst structure according to one aspect of the disclosure.

In the $NO_x$ and HC storage catalysts, one or more of the noble metal atoms may be present in a complex or complexed with (i) the metal oxide, (ii) the non-metal oxide, or (iii) the metal oxide and the non-metal oxide, and the complex may be dispersed within one or more cages of the zeolite. In some embodiments, the noble metal atom be may present in the complex as a metal center. For example, as illustrated in FIG. 1A, a complex 15 comprising a noble metal atom 5 and metal oxides (metal atom 6, oxygen atom 7) is present or dispersed within a cage of the zeolite 10. Although not shown, it is contemplated herein that more than one complex may be dispersed within the zeolite cage. For comparison, FIG. 1B illustrates a known storage catalyst where only a noble metal atom 12 is dispersed within the cage of zeolite 10a. It has been discovered that a $NO_x$ and HC storage catalyst having such a structure where a complex (comprising (i) a noble metal and (ii) a metal oxide and/or a non-metal oxide) is dispersed within a zeolite cage can advantageously result in increased catalytic activity, increased $NO_x$ and/or HC adsorption capacity, and increased noble metal stability. Without being bound by theory, it is believed that when a storage catalyst having only noble metal atoms dispersed within zeolite cages contacts or treats an exhaust gas, the noble metal atoms can escape from the zeolite cages and become sintered particles thereby reducing surface area of the noble metal atoms and decreasing activity and noble metal stability, particularly during fuel rich spikes (e.g., higher concentrations of hydrogen ($H_2$), CO and/or HC). FIG. 2 illustrates such a scenario where the noble metal atoms 12 migrate from the cages of zeolite 10a to form sintered particle 20 in the zeolite 10a during exhaust gas treatment. In contrast, as shown in FIG. 3, it is believed that the complexes 15 comprising a noble metal and (ii) a metal oxide and/or a non-metal oxide remain dispersed within the cages of the zeolite 10 and prevent migration of the noble metals from the zeolite cages during treatment of the exhaust gas even during fuel rich spikes. Thus, the noble metal in the complexes 15 maintain stability and activity resulting in overall increased catalytic activity and $NO_x$ and/or HC adsorption. It is contemplated herein, that FIGS. 1A, 1B, 2, and 3 do not necessarily represent the appropriate scale of atoms, but are provided for illustrative purposes. Although not shown, it is contemplated herein that for the $NO_x$ and HC storage catalysts described herein, noble metal atoms may be present with a complex in the zeolite cages. Additionally or alternatively, for the $NO_x$ and HC storage catalysts described herein, noble metal atoms, complexes, or combinations thereof may also be present in other smaller pores and/or channels in the zeolite structure.

Examples of suitable noble metal atoms for inclusion in the storage catalyst include, but are not limited to, Pt atoms, Pd atoms, Rh atoms, Ir atoms, Ru atoms, Ag atoms, Au atoms, and combinations thereof. In any embodiment, the noble metal atoms may be Pt atoms, Pd atoms, or a combination thereof. The noble metal atoms may be present in the storage catalyst in an amount, based on total weight of the storage catalyst, of at least about 0.1 wt. %, at least about 0.5 wt. %, at least about 1 wt. %, at least about 2.5 wt. %, at least about 5 wt. %, at least about 7.5 wt. %, at least about 10 wt. %, at least about 12.5 wt. %, or about 15 wt. %; or in a range from about 0.1 wt. % to about 15 wt. %, about 0.1 wt. % to about 10 wt. %, about 0.1 wt. % to about 7.5 wt. %, or about 1 wt. % to about 5 wt. %.

Examples of suitable metal oxides for the inclusion in the storage catalyst include, but are not limited to, oxides of metals selected from the group consisting of alkali metals, alkaline earth metals, transition metals, lanthanides and combinations thereof. Examples of suitable alkali metals include, but are not limited to, Li, Na, K, Rb, and Cs. Examples of suitable alkaline earth metals include, but are not limited to, Be, Mg, Ca, Sr, and Ba. Examples of suitable transition metals include, but are not limited to, Ti, Zr, Hf, Cr, Ni, Ru, and Co. Examples of suitable lanthanides include, but are not limited to, La, Ce, and Pr. In any embodiment, the metal of the metal oxides may be selected from the group consisting of Na, K, Mg, Ca, Ba, Ti, Ce, and combinations thereof. In some embodiments, the metal of the metal oxides is not Ce. A non-limiting example of a non-metal of a non-metal oxide can be phosphorus (P). The metal oxide, non-metal oxide, or a combination may be present in the storage catalyst in a molar amount of about one to two times the amount of noble metal atoms present in the storage catalyst. For example, metal oxide, non-metal oxide, or a combination may be present in amount, based on total number of moles of the storage catalyst, of less than or equal to about 10 mol %, less than or equal to about 8 mol %, less than or equal to about 7.5 mol %, less than or equal to about 5 mol %, less than or equal to about 2.5 mol %, or less than or equal to about 1 mol %; or in a range from about 1 mol % to about 10 mol %, about 1 mol % to about 8 mol %, about 1 mol % to about 5 mol %, or about 1 mol % to about 2.5 mol %.

Methods of preparing a $NO_X$ and HC storage catalyst as described herein are also provided. The method may include incorporating noble metal atoms as described herein into or onto a zeolite as described herein to form a noble metal-substituted zeolite. For example, the noble metal atoms may be selected from the group consisting of Pd atoms, Pt atoms, Rh atoms, Ag atoms, Ru atoms, Au atoms, Ir atoms and a combination thereof, and the zeolite may have a framework structure selected from the group consisting of BEA, MFI, CHA, AEI, EMT, ERI, MOR, MER, FER, FAU, LEV, MWW, CON, EUO, and combinations thereof. In some embodiments, the noble metal atoms may be Pt atoms and/or Pd atoms and the zeolite may be selected from the group consisting of chabazite, SSZ-13, DAF-5, LZ-218, UiO-21, ZK-14, ZYT-6, and combinations thereof.

Typical methods for incorporation of a metal, such as a noble metal, on a zeolite include impregnation (such as by incipient wetness), ion exchange, deposition by precipitation, grinding (wet or dry), and any other convenient method for depositing a metal on a zeolite. For example, during an ion exchange process, zeolite particles may be contacted by an aqueous or non-aqueous solution of a noble metal salt, which may be at a temperature of greater than 50° C. during the ion-exchange process. The noble metal salt may comprise a noble metal hydroxide, a noble metal carbonate, a noble metal chloride, a noble metal nitrate, a noble metal sulfate, or a combination thereof. The noble metal-substituted zeolite particles formed during the ion exchange process may be separated from the solvent after ion exchange is complete by any suitable method, for example, by centrifuge. The noble metal-substituted zeolite particles may be cleaned by removing residual ions and solvent therefrom, for example, by being washed with deionized water. Thereafter, the noble metal-substituted zeolite particles may be calcined by being heated, for example, at a temperature greater than about 100° C. for a sufficient time to remove adsorbed water therefrom. The noble metal-substituted zeolite may be calcined in a dry environment or in a vacuum to accelerate the water removal process. For example, the noble metal-substituted zeolite particles may be calcined in an environment having less than 20% relative humidity, or in an environment as dry as possible. In one form, the noble metal-substituted zeolite particles may be calcined by being heated at a temperature in the range of 400-600° C. for a time between 1 to 5 hours.

In order to form the metal oxide, non-metal oxide, or combination thereof in the storage catalyst, a metal oxide precursor, a non-metal oxide precursor, or a combination thereof may be added to the noble metal-substituted zeolite. Thus, the method may further include adding a metal oxide precursor, a non-metal oxide precursor, or a combination thereof to the noble-metal substituted zeolite to form an intermediate catalyst by any suitable methods known by those skilled in the art, for example, impregnation (such as by incipient wetness), ion exchange, dry grinding, or wet grinding. The metal of the metal oxide precursory may be selected from the group consisting of alkali metals, alkaline earth metals, transition metals, lanthanides and a combination thereof. For example, the metal of the metal oxide precursor may be selected from the group consisting of Na, K, Mg, Ca, Ba, Ti, Ce, and a combination thereof. Examples of metal oxide precursors include, but are not limited, to salts of the metal of the metal oxides, for example, hydroxides, carbonates, chlorides, nitrates, sulfates, or combinations thereof of the metal of the metal oxide. Examples of non-metal oxide precursors include, but are not limited to, acids of the non-metal (e.g., P) of the non-metal oxide (referred to herein as "non-metal acids"), salts of the non-metal acids, esters of the non-metal acids, and combinations thereof. For example, in order to form phosphorus oxide in the storage catalyst, a solution comprising phosphoric acid or phosphate may be added to the noble-metal substituted zeolite via the methods described above. The metals oxide precursor and/or non-metal oxide precursor may be added in amount to avoid blocking of the cages or channels of the zeolite, for example, an amount, based on total number of moles of the storage catalyst, of less than or equal to about 10 mol %, less than or equal to about 8 mol %, less than or equal to about 7.5 mol %, less than or equal to about 5 mol %, less than or equal to about 2.5 mol %, or less than or equal to about 1 mol %; or in a range from about 1 mol % to about 10 mol %, about 1 mol % to about 8 mol %, about 1 mol % to about 5 mol %, or about 1 mol % to about 2.5 mol %.

Without being bound by theory, it is believed that calcining the intermediate catalyst under sufficient conditions can immobilize one or more noble metal atoms with the metal oxide to form the complex described herein, which is dispersed within a cage of the zeolite. Thus, the method can further include calcining the intermediate catalyst under sufficient conditions to form a complex dispersed within a cage of the zeolite, wherein the complex comprises (i) one or more of the noble metal atoms and (ii) the metal oxide and/or the non-metal oxide. For example, the intermediate catalyst may be calcined at a slower ramp rate from a temperature of about 15° C. up to a temperature of about 800° C., for example, from about 15° C. up to about 750° C., from about 15° C. up to about 500° C., from about 15° C. up to about 250° C., or from about 15° C. up to about 100° C. Examples of suitable ramp rates include, but are not limited to, a ramp rate of less than or equal to about 10° C./minute, less than or equal to about 7.5° C./minute, less than or equal to about 5° C./minute, less than or equal to about 4° C./minute, less than or equal to about 2° C./minute, or about 1° C./minute; or in a range of about 1° C./minute to about 10° C./minute, about 1° C./minute to about 5° C./minute, about 1° C./minute to about 4° C./minute, or about 1° C./minute to about 2° C./minute. In some embodiments, the calcining can occur at a ramp rate of about 1° C./minute and up to a temperature of about 650° C. to about 750° C. The calcining of the intermediate catalyst can occur for any suitable amount of time required to raise the temperature of the intermediate catalyst to the desired temperature at the desired ramp rate, for example, for at least about 5 minutes, at least about 30 minutes, at least about 1 hour, at least about 12 hours, at least about 24 hours, at least about 36 hours, at least about 48 hours, at least about 60 hours, or least about 72 hours, or in a range from about 5 minutes to about 72 hours, about 1 hour to 72 hours, about 12 hours to about 60 hours or about 24 hours to about 48 hours. In any embodiment, the calcining can occur in air, for example, with a moisture content of about 5% or less.

The method may also further comprise drying of the noble metal-substituted zeolite, the intermediate catalyst, or both, for example, drying may be performed under a vacuum. The noble metal-substituted zeolite, the intermediate catalyst, or both may be dried at a temperature of at least about 15° C., at least about 25° C., at least about 50° C., at least about 75° C., at least about 100° C., at least about 125° C., at least about 150° C., at least about 175° C. or about 200° C.; or in a range of about 15° C. to about 200° C., about 15° C. to about 150° C., about 25° C. to about 125° C., or about 50° C. to about 100° C. In some embodiments, the drying may occur at about 100° C. for about 10 hours to about 72 hours. In some embodiments, the intermediate catalyst may undergo further calcining, for example, a second calcining, as described above to form the storage catalyst.

It is contemplated herein that the storage catalyst described herein may be used in an exhaust gas treatment systems (further described below). In such instances, the storage catalyst may be present as a coating, such as a washcoating, on a substrate. In some embodiments, a $NO_x$ and HC storage catalyst washcoating loading may be about 50 g/l to about 200 g/l or about 100 g/l to about 150 g/l. Additionally or alternatively, the second catalyst washcoating loading may be about 50 g/l to about 200 g/l or about 100 g/l to about 150 g/l.

The substrate may be any of those materials typically used for preparing catalysts, and can usually comprise a ceramic or metal material. For example, the ceramic substrate may include a suitable refractory material, e.g., cordierite, cordierite-alumina, silicon nitride, silicon carbide, zircon mullite, spodumene, alumina-silica magnesia, alumina titanate, zircon silicate, sillimanite, a magnesium silicate, zircon, metalize, alpha-alumina, an aluminosilicate and the like. A metallic substrate may be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface of the metal substrates may be oxidized at high temperatures, e.g., 1000° C. and higher, to improve the resistance to corrosion of the alloys by forming an oxide layer on the surfaces the substrates. Such high temperature-induced oxidation may enhance the adherence of the refractory metal oxide support and catalytically promoting metal components to the substrate.

Any suitable substrate may be employed, such as a monolithic substrate, for example, a honeycomb monolith, of the type having fine, parallel gas flow passages extending therethrough from an inlet or an outlet face of the substrate, such that passages or channels are open to fluid flow therethrough (referred to as "honeycomb flow-through monolith"). The passages, which are essentially straight paths from their fluid inlet to their fluid outlet, are defined by walls on which the catalytic material is disposed as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 400 or more gas inlet openings (i.e., cells) per square inch of cross section.

The substrate can also be a wall-flow honeycomb substrate or monolith, where adjacent channels are alternately blocked, allowing a gaseous stream entering the channels from one direction (inlet direction), to flow through porous channel walls and exit from the channels from the other direction (outlet direction). Catalytic material may be disposed as a washcoat on the channels (inlet and outlet) of a wall-flow substrate. The porous channel walls may also act as a filter medium. The wall-flow filter substrate can be made from materials commonly known in the art, such as cordierite, aluminum titanate or silicon carbide. It will be understood that the loading of the catalytic composition on a wall-flow substrate will depend on substrate properties such as porosity and wall thickness, and can be lower than loading on a flow-through substrate.

In alternative embodiments, catalytic compositions may be deposited on an open cell foam substrate. Such substrates are well known in the art, and are typically formed of refractory ceramic or metallic materials.

The storage catalyst described herein can optionally comprise a support or binder material (binder). It is contemplated herein that in addition to the metals described above being supported on the zeolite, at least a portion of the metals may be supported on the binder, or a combination thereof.

Binders may be catalytically active or inactive and include other zeolites, other inorganic materials such as clays and metal oxides such as alumina, silica, silica-alumina, titania, zirconia, Group 1 metal oxides, Group 2 metal oxides, and combinations thereof. Clays may be kaolin, bentonite and montmorillonite and are commercially available. They may be blended with other materials such as silicates. Other binary porous matrix materials in addition to silica-aluminas include materials such as silica-magnesia, silica-thoria, silica-zirconia, silica-beryllia and silica-titania. Ternary materials such as silica-alumina-magnesia, silica-alumina-thoria and silica-alumina-zirconia can also be suitable for use as binders. A binder may be present in a storage catalyst coating in an amount of about at least about 5 wt. %, at least about 10 wt. % or at least about 20 wt. %, based on total weight of the washcoating.

In various aspects, a storage catalyst coating may be applied to a substrate as a washcoating. This may be accomplished by standard washcoating techniques known in the art. For example, an aqueous slurry of binder particles (e.g., alumina) and storage catalyst particles (e.g., zeolite particles with one or more complexes comprising a metal oxide and noble dispersed in one or more zeolite cages) may be prepared. The substrate may then be immersed into the slurry and excess slurry removed to provide a thin coating of the slurry on the walls of the channels of the substrate. The coated substrate may then be dried and calcined to provide an adherent coating of the catalytic component to the walls of the channels thereof. One or more additional layers may be provided to the substrate. After each layer is applied, or after a number of desired layers is applied, the substrate may then be dried and calcined to provide a finished $NO_x$ and HC storage device.

Figure 4:
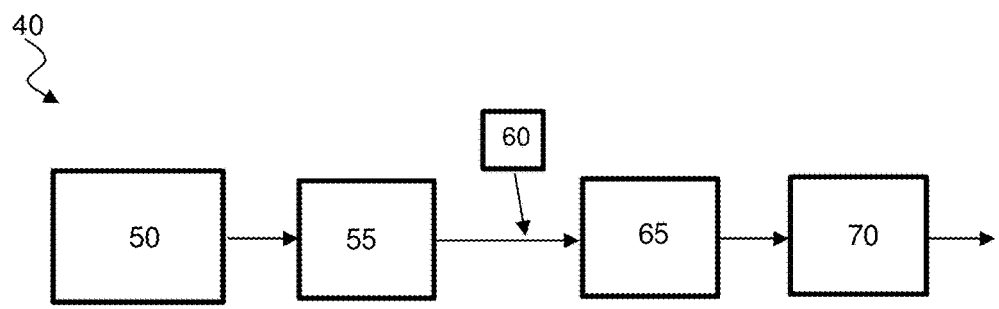
FIG. 4 is a schematic illustration of an exhaust gas treatment system according to one aspect of the disclosure.

The $NO_x$ and HC storage device may be included in an exhaust gas treatment system. For example, as depicted in FIG. 4, an exhaust gas treatment system 40 includes an engine 50, for example a diesel engine, where exhaust gas may flow from an exhaust manifold of the engine 50 and enter a $NO_x$ and HC storage device 55, which is coupled to the engine 50. The $NO_x$ and HC storage device 55 includes a $NO_x$ and HC storage catalyst as described herein disposed on a substrate as described herein, for example, the $NO_x$ and HC storage catalyst may present as coating on one or more channels, such as on a portion of a surface of the channels, of a honeycomb flow-through monolith. The $NO_x$ and HC storage device 55 may be housed in a housing (not shown), such as a metal can, configured to provide support and direct the exhaust gas flow into, through and out of the $NO_x$ and HC storage device 55. The housing may have any suitable shape or size including a cylindrical shape. The housing may also include attachment features located proximate to an inlet opening, such as an inlet pipe, and an outlet opening, such as an outlet pipe, for fluid coupling of the $NO_x$ and HC storage device 55 to an exhaust pipe and/or other component of the exhaust gas treatment system 40.

A reductant source 60 may added to the exhaust gas flow exiting the $NO_x$ and HC storage device 55, and the exhaust gas may then enter an SCR device 65, which is coupled to the $NO_x$ and HC storage device 55. In the exhaust gas treatment system 40, the SCR device 65 can reduce NOx using a reductant, such as ammonia ($NH_3$). The ammonia may be introduced in the exhaust gas treatment system 40 through a urea solution, e.g. a diesel exhaust fluid (DEF) solution, injected into the exhaust gas through the reductant source 60, for example, a reductant injector. Optionally, the exhaust gas flow may be mixed with the urea solution via a mixer (not shown). The urea solution mixes with the hot exhaust gas and produces ammonia ($NH_3$), which is an agent for reducing NOx in the exhaust gas. In other variations, the reductant can include fuel, particularly diesel fuel and fractions thereof as well as any hydrocarbons and oxygenated hydrocarbons collectively referred to as an HC reductant.

The SCR device 65 includes selective catalytic reduction (SCR) catalyst compositions disposed on a substrate, such as a honeycomb monolith as described herein. As used herein, the term "SCR catalyst" refers broadly to a catalyst capable of selective catalytic reduction including catalyzing a reaction of $NO_x$ with a reductant as described herein to reduce the $NO_x$. The SCR device 65 may be housed in a housing (not shown), such as a metal can, configured to provide support and direct the exhaust gas flow into, through and out of SCR device 65. The housing may have any suitable shape or size including a cylindrical shape. The housing may also include attachment features located proximate to an inlet opening, such as an inlet pipe, and an outlet opening, such as an outlet pipe, for fluid coupling of the SCR device 65 to an exhaust pipe and/or other component of the exhaust gas treatment system 40.

The exhaust gas treatment system 40 may also include a diesel particulate filter (DPF) 70, which is coupled to the SCR device 65, for trapping and/or removing particulate matter from the exhaust gas flow exiting the SCR device 65. In an alternative embodiment (not shown), an SCR device and/or SCR filter (SCRF) may replace SCR device 65 and DPF 70. Additionally or alternatively, the exhaust gas treatment system 40 may include a rear OC (ROC) (now shown) for $NH_3$ cleanup. An ROC may be in fluid communication with SCR device 65 or an ROC may be in fluid communication with an SCRF.

Figure 5:
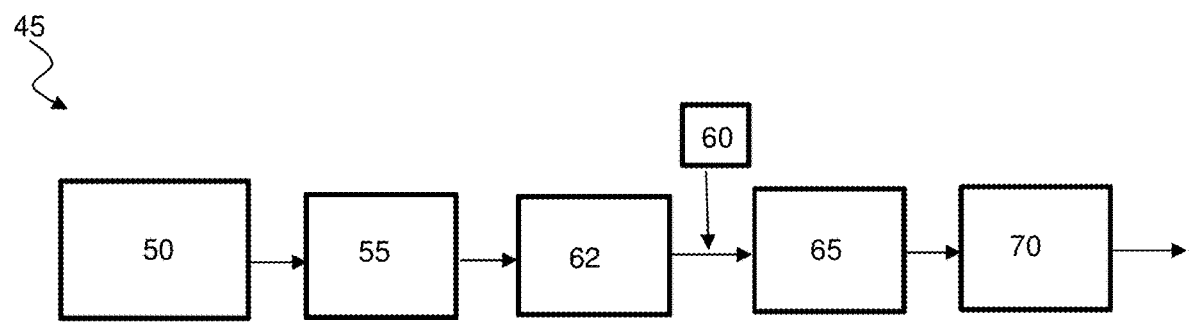
FIG. 5 is a schematic illustration of an exhaust gas treatment system according to another aspect of the disclosure.

Exhaust gas treatment system 40 may also include singly, or in combination, additional exhaust after-treatment devices, including catalyzed or uncatalyzed particulate filters, additional oxidation catalysts, catalyzed soot filters, soot filters, $NO_x$ traps, NSR catalysts, partial hydrocarbon oxidation catalysts, air pumps, external heating devices, precious metal catalysts, sulfur traps, phosphorous traps, $PO_x$ reformers and the like. Each of the additional exhaust after-treatment devices employs technologies having various capabilities for treating the constituent elements of the exhaust gas flow. These devices may be fluidly connected in series or parallel using known pipes, conduits and connectors In an alternative arrangement, as illustrated in FIG. 5, an oxidation catalyst (OC) unit 62, such as a diesel oxidation catalyst (DOC) unit, may be included in an exhaust gas treatment system 45. The OC unit 62 (e.g., DOC unit) may be in fluid communication with the $NO_x$ and HC storage device 55 and is configured to oxidize certain constituents of the exhaust gas flow exiting the $NO_x$ and HC storage device 55. Generally, the OC unit 62 may be a flow-through device, as described herein, that consists of a metal or ceramic monolith or substrate having a honeycomb-like structure that includes a plurality of generally parallel, longitudinally-extending, interconnected cells that provide a network comprising a plurality of flow channels for receiving the exhaust gas flow and are separated by a corresponding network of cell walls. The substrate has a large surface area along the cell walls. The cell walls have a washcoat that includes a porous ceramic matrix with a surface that is coated with an OC, such as a DOC. For example, the washcoat includes a porous ceramic matrix with a surface that is coated with a catalytically active amount of a Pt group metal catalyst.

Suitable platinum group metals include Pt, Pd, Rh, Ru, Os or Ir, or a combination thereof. Of these, Pt or Pd, or combinations thereof, including alloys thereof, are particularly useful. Those that include both Pt and Pd are particularly useful, such as those having Pt:Pd ratios of about 10:4 to about 1:10. As the exhaust gas flow traverses the length of the OC unit 62, particularly the flow channels and the washcoated cell walls, the platinum group metal catalyst may catalyze the oxidation of CO to $CO_2$, as well as catalyzing the oxidation of various hydrocarbons (HC), including gaseous hydrocarbons and liquid hydrocarbon particles, including unburned fuel or oil, or fuel or other HC reductants that are introduced into exhaust gas treatment system to form $CO_2$ and $H_2O$, thereby reducing harmful emissions. For example, the OC unit 62 may be configured to oxidize hydrocarbons (HC) to carbon dioxide $CO_2$ and water ($H_2O$), convert carbon monoxide (CO) to carbon dioxide ($CO_2$) and convert nitrogen oxide (NO) to nitrogen dioxide ($NO_2$), or otherwise. Other oxidations are contemplated as well, such as oxidation of aldehydes, polycyclic aromatic hydrocarbons or otherwise. Further, the reactions in OC unit 62 unit may be used to reduce the odor of certain emission components.

The OC unit 62 may be housed within a separate housing (not shown), including a metal housing, such as a metal can having an inlet opening and outlet opening, or otherwise, configured for providing support and directing fluid flow to the OC unit 62. The housing may comprise any suitable shape or size including a cylindrically shaped compartment. The compartment further may include attachment features, such as a cylindrical inlet pipe located proximate an inlet opening and a cylindrical outlet pipe located proximate an outlet opening of the compartment for fluid coupling of OC unit 62 to an exhaust pipe and/or another component of the exhaust gas treatment system 45. It should be appreciated that OC unit 62 may include one or more additional components for facilitating operation of OC unit 62 or exhaust gas treatment system 45, but not limited to, various gas or temperature sensors, injectors (urea or fuel injectors) or otherwise. Such additional features may be particularly advantageous for monitoring characteristics of the exhaust gas, such as flow rate of certain emission components (e.g., particulate matter or otherwise).

In some embodiments, the OC unit 62 may be incorporated with the $NO_X$ and HC storage device 55. For example, the $NO_x$ and HC storage device 55 may also include an OC, such as a DOC, or the $NO_x$ and HC storage device 55 and the OC unit 62 may be present in the same housing.

In an alternative embodiment (not shown), OC unit 62 may be upstream of the $NO_X$ storage catalyst 55 and in fluid communication with engine 50. The $NO_X$ storage catalyst 55 may be downstream of the OC unit 62 and in fluid communication with the OC unit 62. The SCR device 65 may be in fluid communication with the $NO_x$ storage catalyst 55, and the DPF 70 may be in fluid communication with the SCR device 65.

II. Methods of Treating Exhaust Gas

Methods of treating an exhaust gas stream with a $NO_x$ and HC storage catalyst described herein are also provided. In various aspects, the exhaust gas stream may be flowing from a vehicle internal combustion engine during a period following cold-start of the engine. The method may include contacting the exhaust gas stream comprising one or more of $NO_x$, HC, carbon monoxide (CO), hydrogen ($H_2$), water ($H_2O$), carbon dioxide ($CO_2$), oxygen ($O_2$), and nitrogen ($N_2$) with a $NO_x$ and HC storage device as described herein (e.g., $NO_X$ and HC storage device 55) under adsorption conditions and storing at least a portion of the $NO_x$, HC, or a combination thereof from the exhaust gas stream.

The adsorption conditions can include an adsorption temperature of the exhaust gas stream wherein the $NO_x$ and HC storage device is capable of adsorbing or storing at least a portion of the $NO_x$, HC, or a combination thereof from the exhaust gas stream, for example, until a downstream reactor for further oxidation (e.g., DOC) and/or reduction (e.g., SCR) of the constituents of the exhaust gas stream are heated sufficiently to an oxidation operating temperature and/or a reducing operating temperature. The adsorption temperature of the exhaust gas stream may vary depending on the operating conditions and engine and exhaust gas treatment configuration. In some embodiments, an adsorption temperature of the exhaust gas stream may be a temperature of less than or equal to about 250° C., less than or equal to about 225° C., less than or equal to about 200° C., less than or equal to about 175° C., less than or equal to about 150° C., less than or equal to about 125° C., less than or equal to about 100° C., less than or equal to about 75° C., less than or equal to about 50° C., less than or equal to about 25° C., or less than or equal to about 0° C.; or in a range from about 0° C. to about 250° C., about 0° C. to about 225° C., about 0° C. to about 200° C., about 0° C. to about 175° C., or about 0° C. to about 150° C.

Under the adsorption conditions described above, the amount of $NO_x$ and/or HC that can be adsorbed and stored in the $NO_x$ and HC storage device can be at least about 10%, at least about 20%, at least about 30%, at least about 40%, at least about 50%, at least about 60%, at least about 70%, at least about 80%, at least about 90%, at least about 95%, or up to 100% of the $NO_x$ and/or HC present in the exhaust gas stream. For example, about 10% to about 100%, about 30% to about 100%, about 40% to about 95%, about 50% to about 90%, or about 60% to 80% of the $NO_x$ and/or HC from the exhaust gas stream can be stored in the $NO_x$ and HC storage device. In various aspects, the amount $NO_x$ present in the exhaust gas stream, for example, exiting a diesel engine following engine cold-start, may be at least about 25 ppm, at least about 50 ppm, at least about 100 ppm, at least about 150 ppm, at least about 200 ppm, at least about 250 ppm, at least about 300 ppm, or about 350 ppm; or in range from about 25 ppm to about 350 ppm, about 50 ppm to about 300 ppm, about 50 ppm to about 250 ppm, or about 100 ppm to about 250 ppm.

Advantageously, the $NO_x$ and HC storage device as described herein can adsorb and store $NO_x$ and/or HC even during fuel rich spikes in the exhaust gas stream, for example, when the exhaust gas stream comprises increased amounts of one or more of: $H_2$, CO, and HC. In some embodiments, the exhaust gas stream contacting the $NO_x$ and HC storage device may have an $H_2$ content of at least about 30 ppm, at least about 50 ppm, at least about 100 ppm, at least about 250 ppm, at least about 500 ppm, at least about 750 ppm, at least about 1000 ppm, at least about 1500 ppm, at least about 2000 ppm, at least about 2500 ppm, at least about 3000 ppm, at least about 3500 ppm, at least about 4000 ppm, at least about 4500 ppm, at least about 5000 ppm, or about 6000 ppm; or in a range from about 30 ppm to about 6000 ppm, about 50 ppm to about 5000 ppm, about 75 ppm to about 2500 ppm or about 100 ppm to about 1000 ppm. Additionally or alternatively, the exhaust gas stream contacting the $NO_x$ and HC storage device may have a CO content of at least about 30 ppm, at least about 50 ppm, at least about 100 ppm, at least about 250 ppm, at least about 500 ppm, at least about 750 ppm, at least about 1000 ppm, at least about 2500 ppm, at least about 5000 ppm, at least about 7500 ppm, at least about 10,000 ppm, at least about 12,500 ppm, at least about 15,000 ppm, at least about 16,000 ppm, or about 20,000 ppm; or in a range from about 30 ppm to about 20,000 ppm, about 50 ppm to about 16,000 ppm, about 75 ppm to about 10,000 ppm, about 75 ppm to about 5,000 ppm, or about 100 ppm to about 1500 ppm. Additionally or alternatively, the exhaust gas stream contacting the $NO_x$ and HC storage device may have an HC content of at least about 30 ppm, at least about 50 ppm, at least about 100 ppm, at least about 250 ppm, at least about 500 ppm, at least about 750 ppm, at least about 1000 ppm, at least about 1500 ppm, at least about 2000 ppm, at least about 2500 ppm, at least about 3000 ppm, at least about 3500 ppm, at least about 4000 ppm, at least about 4500 ppm, at least about 5000 ppm, at least about 7500 ppm, at least about 8000 ppm or about 10,000 ppm; or in a range from about 30 ppm to about 10,000 ppm, about 50 ppm to about 8000 ppm, about 75 ppm to about 5000 ppm, about 500 ppm to about 8000 ppm or about 100 ppm to about 2000 ppm. Examples of HC present in the exhaust gas stream include, but are not limited to one or more of, $CH_4$, $C_2H_4$, $C_3H_6$, $C_3H_8$, $C_5H_{12}$, $C_7H_8$, $C_8H_{10}$, $C_8H_{18}$, $C_{10}H_{22}$, and so on.

The method may further include releasing at least a portion of the stored $NO_X$ and/or HC from the $NO_x$ and HC storage catalyst to the exhaust stream under desorption conditions. The desorption conditions can include a desorption temperature of the exhaust gas stream wherein the $NO_x$ and HC storage device is capable of desorbing or releasing at least a portion of the $NO_x$ and/or HC to the exhaust gas stream, for example, a temperature at which a downstream reactor for further oxidation (e.g., DOC) and/or reduction (e.g., SCR) can oxidize and/or reduce the released $NO_x$ and/or HC present in the exhaust gas stream flow from the $NO_x$ and HC storage device. The desorption temperature of the exhaust gas stream may vary depending on the operating conditions and engine and exhaust gas treatment configuration. In some embodiments, a desorption temperature of the exhaust gas stream may be a temperature of greater than or equal to about 150° C., greater than or equal to about 175° C., greater than or equal to about 200° C., greater than or equal to about 225° C., greater than or equal to about 250° C., greater than or equal to about 300° C., greater than or equal to about 400° C., or greater than or equal to about 500° C.; or in a range from about 150° C. to about 500° C., about 175° C. to about 500° C., about 200° C. to about 500° C., about 200° C. to about 400° C., or about 200° C. to about 300° C. It is contemplated herein, that a portion of the HC (e.g., $C_8H_{10}$) in the exhaust gas stream may be oxidized by the $NO_x$ and HC storage catalyst before a portion of the stored $NO_x$ and/or HC from the $NO_x$ and HC storage catalyst is released.

Under the desorption conditions described above, the amount of $NO_x$ and/or HC that can be desorbed and released from the $NO_x$ and HC storage device to the exhaust gas stream can be at least about 10%, at least about 20%, at least about 30%, at least about 40%, at least about 50%, at least about 60%, at least about 70%, at least about 80%, at least about 90%, at least about 95%, or up to 100% of the $NO_X$ and/or HC stored in the $NO_X$ and HC storage device. For example, about 10% to about 100%, about 30% to about 100%, about 40% to about 95%, about 50% to about 90%, or about 60% to 80% of the of the $NO_x$ and/or HC in the $NO_x$ and HC storage device can be released from the $NO_x$ and HC storage device to the exhaust gas stream.

The method may further include passing the exhaust gas stream through at least one downstream oxidation reactor, such as OC unit 62, in fluid connection with the $NO_x$ and HC storage device for further oxidation of constituents (e.g., (HC), (CO), $H_2$, $H_2O$, $CO_2$, $O_2$, $N_2$, or a combination thereof) of the exhaust gas stream as the exhaust gas stream increases in temperature and heats the downstream oxidation reactor to an oxidation operating temperature, for example, a temperature greater than or equal to about 150° C., greater than or equal to about 175° C., greater than or equal to about 200° C., etc. Additionally or alternatively, the method may further include passing the exhaust gas stream through at least one downstream reduction reactor, such as SCR device 65, in fluid connection with the $NO_x$ and HC storage device for further reduction of constituents (e.g., (HC), (CO), $H_2$, $H_2O$, $CO_2$, $O_2$, $N_2$, or a combination thereof) of the exhaust gas stream as the exhaust gas stream increases in temperature and heats the downstream reduction reactor to reduction operating temperature, for example, a temperature greater than or equal to about 150° C., greater than or equal to about 175° C., greater than or equal to about 200° C., etc. It is contemplated herein that the exhaust stream may be passed to the at least one downstream oxidation reactor and/or downstream reduction reactor during the period following cold-start of the engine and while the exhaust stream gas stream increases in temperature during operation of the engine.

In various aspects, the $NO_x$ and HC storage device may comprise a $NO_x$ and HC storage catalyst disposed on a substrate as described herein, for example, a honeycomb flow through monolith. For example, the $NO_x$ and HC storage catalyst may comprise a zeolite comprising cages, noble metal atoms, and a metal oxide. One or more of the noble metal atoms may be present in a complex with the metal oxide and the complex may be dispersed within a cage of the zeolite. The noble metal atoms, for example, present in an amount of about 0.1 wt. % to about 10 wt. %, may be selected from the group consisting of Pd atoms, Pt atoms, Rh atoms, Ag atoms, Ru atoms, Au atoms, Ir atoms and a combination thereof, and the zeolite may have a framework structure selected from the group consisting of BEA, MFI, CHA, AEI, EMT, ERI, MOR, MER, FER, FAU, LEV, MWW, CON, EUO, and a combination thereof. In some embodiments, the noble metal atoms may be Pt atoms and/or Pd atoms and the zeolite may be selected from the group consisting of chabazite, SSZ-13, DAF-5, LZ-218, UiO-21, ZK-14, and ZYT-6. The metal of the metal oxide may be selected from the group consisting of alkali metals, alkaline earth metals transitions metals, lanthanides, and a combination thereof, particularly, Na, K, Mg, Ca, Ba, Ti, Ce, and a combination thereof. The metal oxide may be present in an amount of about 1 mol % to about 8 mol %.

EXAMPLES

Example 1—Preparation of $NO_X$ and HC Storage Catalysts

A zeolite having an MFI framework structure with $Si/Al_2$ ratio of 19 was used. To the zeolite, 0.5 wt % Pd was added through ion exchange using $Pd(NO)_3$ with 5 g of zeolite in a 1 L water suspension at 70° C. for an overnight period (about 6 to 12 hours). The collected suspension was filtered, washed with water, and dried at 100° C. in vacuum for 12 hours to produce a Pd-exchanged zeolite powder. Barium additives (for example, barium oxide) were next added to the dried Pd-exchanged zeolite powder through incipient wet impregnation of $Ba(NO_3)_2$ to the Pd-exchanged zeolite (Pd:Ba molar ratio=1:5) at room-temperature (about 18° C. to 25° C.). The obtained slurry was dried at 100° C. in vacuum for 72 hrs. Final calcination was done by heating up the sample in air to 550° C. at a heating rate of 1° C./minute, and holding at the target temperature for 5 hours to form Storage Catalyst A.

Comparative Catalyst B was prepared as described above for Storage Catalyst A except without the addition of barium additives via incipient wetness, so Comparative Catalyst B was a Pd-exchanged zeolite.

Example 2—HC and NOx Storage Capacity Testing

HC Capacity

Storage Catalyst A and Comparative Catalyst B were stabilized in a tube reactor by contacting each with a gas stream at 0.5 L/min and 1,500,000 cm$^3$ g$_{cat}^{-1}$ h$^{-1}$ for 30 minutes at 100° C. The gas stream contained 5000 ppm CO, 500 ppm HC ($C_3H_6$:$C_3H_8$=2:1), 1.0% $O_2$, 5% $H_2O$ and the balance $N_2$ balance. Following stabilization, Storage Catalyst A and Comparative Catalyst B continued to contact the gas stream, and the tube reactor was heated at a rate of rate of 2° C./minute to test HC storage. The experiment was ran until the tube reactor reached 450° C.

Figure 6:
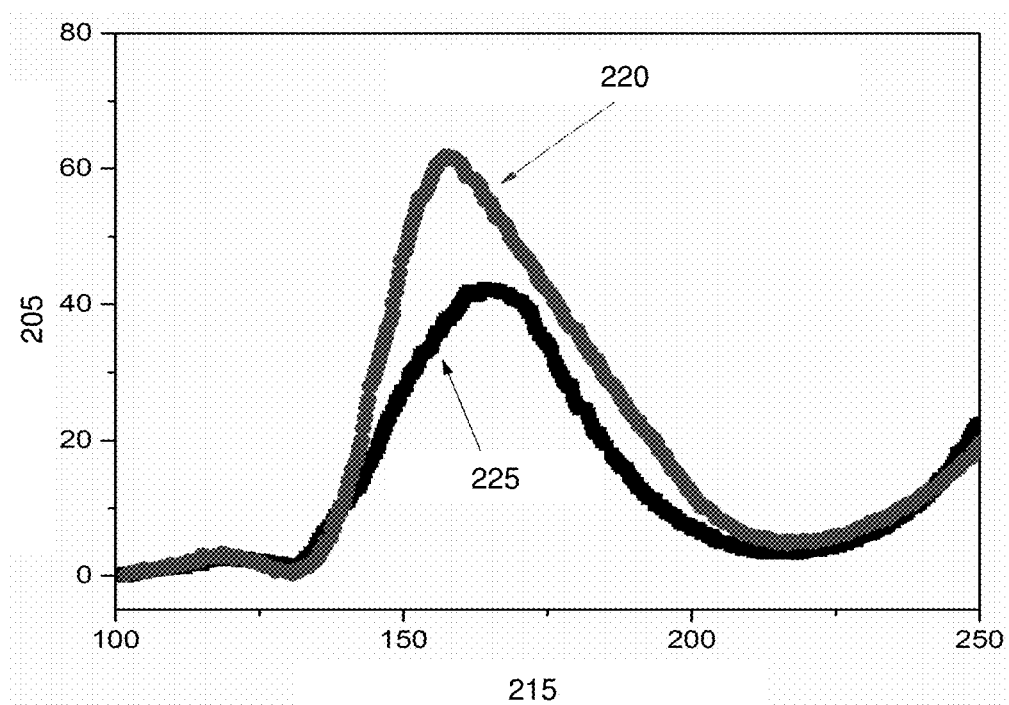
FIG. 6 illustrates $C_3H_6$ conversion (%) versus temperature (° C.) for the Storage Catalyst A 220 and the Comparative Catalyst B 225.

The results are shown in FIG. 6. FIG. 6 shows conversion of the HC, propane ($C_3H_6$), for the Storage Catalyst A 220 and the Comparative Catalyst B 225. In FIG. 6, the y-axis 205 shows $C_3H_6$ conversion (%), and the x-axis 215 shows temperature (° C.). The HCs conversion above 200 C relates to the permanent oxidation of the HCs. The HCs conversion from 125 to 200 C is the result of temporary HC storage in the catalyst. The higher conversion of HC below 200 C means larger HC storage capacity.

NO Capacity

Storage Catalyst A and Comparative Catalyst B were each pretreated in a gas feed containing 10% $O_2$ at 500° C. for 30 minutes and then cooled down to 50° C. Storage Catalyst A and Comparative Catalyst B were then contacted with a gas feed containing 200 ppm NO and 10% $O_2$ for adsorption testing of 60 minutes. The gas feed was then switched to He to purge out residual NOx in the gas phase. The temperature-programmed desorption was carried out at a rate of 200° C./minute.

Figure 7:
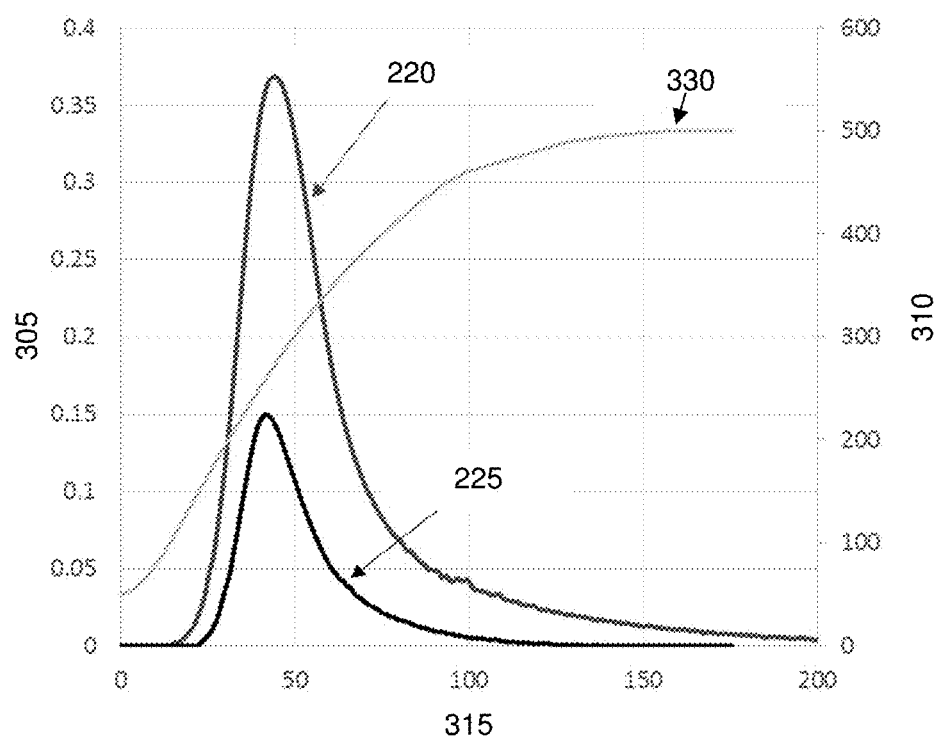
FIG. 7 illustrates NO concentration (%) versus temperature (° C.) and time (seconds) for the Storage Catalyst A 220 and the Comparative Catalyst B 225.

The results are shown in FIG. 7. FIG. 7 shows NO adsorption for the Storage Catalyst A 220 and the Comparative Catalyst B 225. In FIG. 7, the y-axis 305 shows NO concentration (%), the other y-axis 310 shows temperature (° C.), and the x-axis 315 shows time (seconds). The temperature profile 330 during the experiment is also shown.

Example 3—Fuel Rich Performance Testing

Storage Catalyst A and Comparative Catalyst B were each pretreated in a gas feed containing 1% $H_2$ at 400° C. for 30 minutes and then cooled down to 50° C. Storage Catalyst A and Comparative Catalyst B were then contacted with a gas feed containing 200 ppm NO, 10% $O_2$ for adsorption testing of 60 minutes. The gas feed was then switched to He to purge out e residual NOx in the gas phase. The temperature-programmed desorption was carried out at a rate of 200° C./minute.

Figure 8:
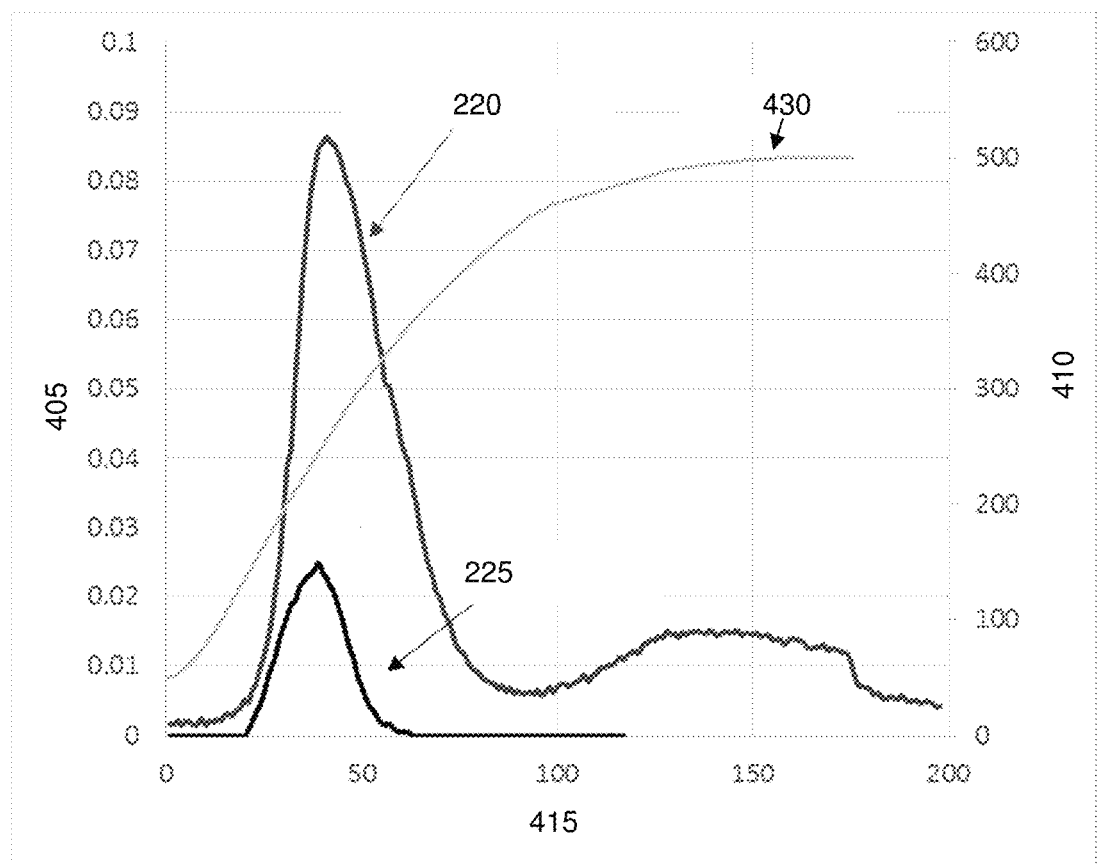
FIG. 8 illustrates NO concentration (%) versus temperature (° C.) and time (seconds) for the Storage Catalyst A 220 and the Comparative Catalyst B 225 during fuel rich conditions.

The results are shown in FIG. 8. FIG. 8 shows NO adsorption for the Storage Catalyst A 220 and the Comparative Catalyst B 225. In FIG. 8, the y-axis 405 shows NO concentration (%), the other y-axis 410 shows temperature (° C.), and the x-axis 415 shows time (seconds). The temperature profile 430 during the experiment is also shown.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A nitrogen oxides ($NO_x$) and hydrocarbon (HC) storage catalyst for treating an exhaust gas flow comprising:
    (a) a zeolite comprising cages and having a framework structure selected from the group consisting of BEA, MFI, CHA, AEI, EMT, ERI, MOR, MER, FER, FAU, LEV, MWW, CON, EUO, and combinations thereof;
    (b) noble metal atoms selected from the group consisting of Pd atoms, Pt atoms, Rh atoms, Ag atoms, Ru atoms, Au atoms, Ir atoms and combinations thereof; and
    (c) a metal oxide, a non-metal oxide, or a combination thereof, wherein the metal of the metal oxide is selected from the group consisting of alkali metals, alkaline-earth metals, transition metals, lanthanides, and combinations thereof, and the non-metal of the non-metal oxide is phosphorus; and
    wherein one or more of the noble metal atoms are present in a complex with: (i) the metal oxide; (ii) the non-metal oxide; or (iii) the metal oxide and the non-metal oxide; and wherein the complex is dispersed within the cage of the zeolite.

2. The storage catalyst of claim 1, wherein the noble metal atoms are present in an amount of about 0.1 wt. % to about 10 wt. % based on total weight of the $NO_x$ and HC storage catalyst.

3. The storage catalyst of claim 1, wherein the metal oxide, the non-metal oxide, or a combination thereof is present in an amount of about 1 mol % to about 8 mol %.

4. The storage catalyst of claim 1, wherein the zeolite is selected from the group consisting of chabazite, SSZ-13, DAF-5, LZ-218, UiO-21, ZK-14, and ZYT-6.

5. The storage catalyst of claim 1, wherein the noble metal atoms are Pd atoms, Pt atoms, or a combination thereof.

6. The storage catalyst of claim 1, wherein the metal of the metal oxide is selected from the group consisting of Na, K, Mg, Ca, Ba, Ti, Ce, and combinations thereof.

7. A method of preparing a $NO_x$ and HC storage catalyst comprising:
    incorporating noble metal atoms into a zeolite to form a noble metal-substituted zeolite, wherein the noble metal atoms are selected from the group consisting of Pd atoms, Pt atoms, Rh atoms, Ag atoms, Ru atoms, Au atoms, Ir atoms and combinations thereof, and the zeolite comprises cages and has a framework structure selected from the group consisting of BEA, MFI, CHA, AEI, EMT, ERI, MOR, MER, FER, FAU, LEV, MWW, CON, EUO, and combinations thereof;
    adding a metal oxide precursor, a non-metal oxide precursor, or a combination thereof in an amount less than about 8 mol. % to the noble metal-substituted zeolite to form an intermediate catalyst, wherein the metal of the metal oxide precursor is selected from the group consisting of alkali metals, alkaline-earth metals, transition metals, lanthanides, and combinations thereof, and the non-metal is phosphorus; and calcining the intermediate catalyst at a ramp rate of less than about 5° C./minute to a temperature up to about 800° C. to form a complex dispersed within the cage of the zeolite, wherein the complex comprises one or more of the noble metal atoms with: (i) a metal oxide; (ii) a non-metal oxide; or (iii) the metal oxide and the non-metal oxide.

8. The method of claim 7, wherein the noble metal atoms are incorporated into the zeolite via ion-exchange, incipient wetness impregnation, or grinding.

9. The method of claim 7, wherein the noble metal atoms are present in the $NO_x$ and HC storage catalyst in an amount of about 0.1 wt. % to about 10 wt. % based on total weight of the $NO_x$ and HC storage catalyst.

10. The method of claim 7, wherein the zeolite is selected from the group consisting of chabazite, SSZ-13, DAF-5, LZ-218, UiO-21, ZK-14, and ZYT-6.

11. The method of claim 7, wherein the noble metal atoms are Pd atoms, Pt atoms, or a combination thereof.

12. The method of claim 7, wherein the metal of the metal oxide is selected from the group consisting of Na, K, Mg, Ca, Ba, Ti, Ce, and combinations thereof.

13. A method of treating an exhaust gas stream flowing from a vehicle internal combustion engine during a period following a cold-start of the engine, the method comprising:
contacting the exhaust gas stream comprising one or more of NOR, HCs, carbon monoxide (CO), hydrogen ($H_2$), water ($H_2O$), carbon dioxide ($CO_2$), oxygen ($O_2$), and nitrogen ($N_2$) with a $NO_x$ and HC storage device under adsorption conditions and storing at least a portion of the NOR, HC, or a combination thereof from the exhaust gas stream in the NOR and HC storage device; wherein the $NO_x$ and HC storage device comprises a NOR and HC storage catalyst disposed on a substrate, wherein the NOR and HC storage catalyst comprises:
(a) a zeolite comprising cages and having a framework structure selected from the group consisting of BEA, MFI, CHA, AEI, EMT, ERI, MOR, MER, FER, FAU, LEV, MWW, CON, EUO, and combinations thereof;
(b) noble metal atoms selected from the group consisting of Pd atoms, Pt atoms, Rh atoms, Ag atoms, Ru atoms, Au atoms, Ir atoms and combinations thereof; and
(c) a metal oxide, a non-metal oxide, or a combination thereof, wherein the metal of the metal oxide is selected from the group consisting of alkali metals, alkaline-earth metals, transition metals, lanthanides, and combinations thereof, and the non-metal of the non-metal oxide is phosphorus; and
wherein one or more of the noble metal atoms are present in a complex with: (i) the metal oxide; (ii) the non-metal oxide; or (iii) the metal oxide and the non-metal oxide; and wherein the complex is dispersed within the cage of the zeolite; and
releasing at least a portion of the stored NOR, HC, or a combination thereof from the $NO_x$ and HC storage device to the exhaust stream under desorption conditions.

14. The method of claim 13, wherein the adsorption conditions comprise the exhaust gas stream at a temperature less than or equal to about 200° C., the desorption conditions comprise the exhaust gas stream at a temperature greater than 200° C., or a combination thereof.

15. The method of claim 13, further comprising passing the exhaust gas stream through a downstream oxidation reactor, a downstream reduction reactor, or a combination thereof for further oxidation or reduction of constituents of the exhaust gas stream as the exhaust gas stream increases in temperature and heats the downstream oxidation reactor to an oxidation operating temperature, the downstream reduction reactor to a reduction operating temperature, or combinations thereof.

16. The method of claim 13, wherein the exhaust gas stream contacting the $NO_x$ and HC storage catalyst comprises one or more of:
(i) an $H_2$ content of about 50 ppm to about 5000 ppm;
(ii) a CO content of about 50 ppm to about 16000 ppm; and
(iii) an HC content of about 50 ppm to about 8000 ppm.

17. The method of claim 13, wherein the noble metal atoms are present in the $NO_x$ and HC storage catalyst in an amount of about 0.1 wt. % to about 10 wt. %, based on total weight of the $NO_x$ and HC storage catalyst.

18. The method of claim 13, wherein the zeolite is selected from the group consisting of chabazite, SSZ-13, DAF-5, LZ-218, UiO-21, ZK-14, and ZYT-6.

19. The method of claim 13, wherein the noble metal atoms are Pd atoms, Pt atoms, or a combination thereof.

20. The method of claim 13, wherein the metal of the metal oxide is selected from the group consisting of Na, K, Mg, Ca, Ba, Ti, Ce, and combinations thereof.

* * * * *